United States Patent

Oikawa et al.

Patent Number: 5,963,211
Date of Patent: Oct. 5, 1999

[54] METHOD AND APPARATUS FOR DIRECTLY GENERATING THREE-DIMENSIONAL IMAGES FROM VOXEL DATA WITH DIVIDING IMAGE GENERATING PROCESSES AND UTILIZING PARALLEL PROCESSES

[75] Inventors: Michio Oikawa, Ebina; Koichi Sano, Yokohama, both of Japan

[73] Assignee: Hitachi, Ltd., Tokyo, Japan

[21] Appl. No.: 08/672,719

[22] Filed: Jun. 28, 1996

[30] Foreign Application Priority Data

Jun. 29, 1995 [JP] Japan ................................. 7-163297

[51] Int. Cl.[6] .................................................. G06T 17/00
[52] U.S. Cl. .............................................................. 345/424
[58] Field of Search .................................. 395/124–130, 395/424–430

[56] References Cited

U.S. PATENT DOCUMENTS 5,506,785  4/1996  Blank et al. .............................. 364/468

OTHER PUBLICATIONS

Foley et al. "Computer Graphics Principles and Practice" Second Edition pp. 855–920, 1990.

*Primary Examiner*—Almis R. Jankus
*Attorney, Agent, or Firm*—Antonelli, Terry, Stout & Kraus, LLP

[57] ABSTRACT

A high-speed 3D image generating apparatus includes a 3D data measuring device, a voxel data converter to convert the measured 3D data into volume data, a volume data storage to store therein the volume data, and a plurality of processors. The apparatus further includes a 3D image generation process unit to generate a 3D image from the volume data, a 3D image generating device which estimates the quantity of calculations necessary to create the 3D image to be projected and which subdivides the 3D image creation process to allocate resultant sub-processes to the respective processors so as to possibly equalize each other the loads imposed on the respective processors, an input device to supply therefrom parameters related to an image display operation, and a 3D image output device to visualize the produced 3D image, whereby calculation load is equally allocated to each of the processors and the processing time is minimized.

6 Claims, 12 Drawing Sheets

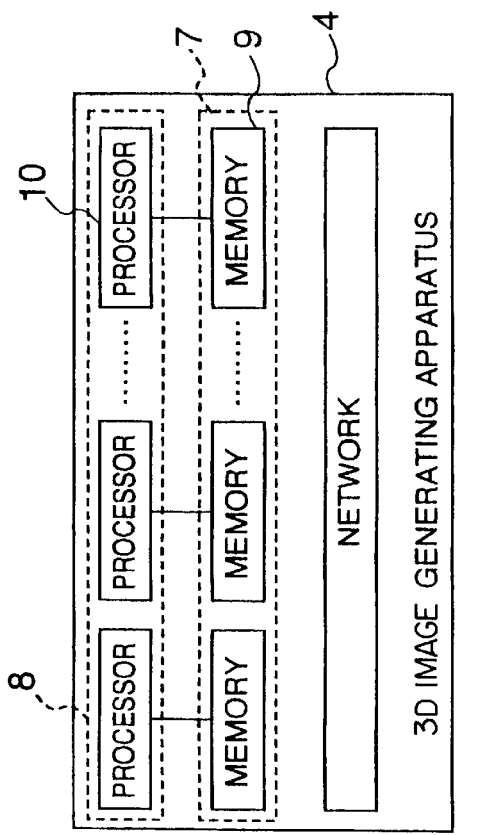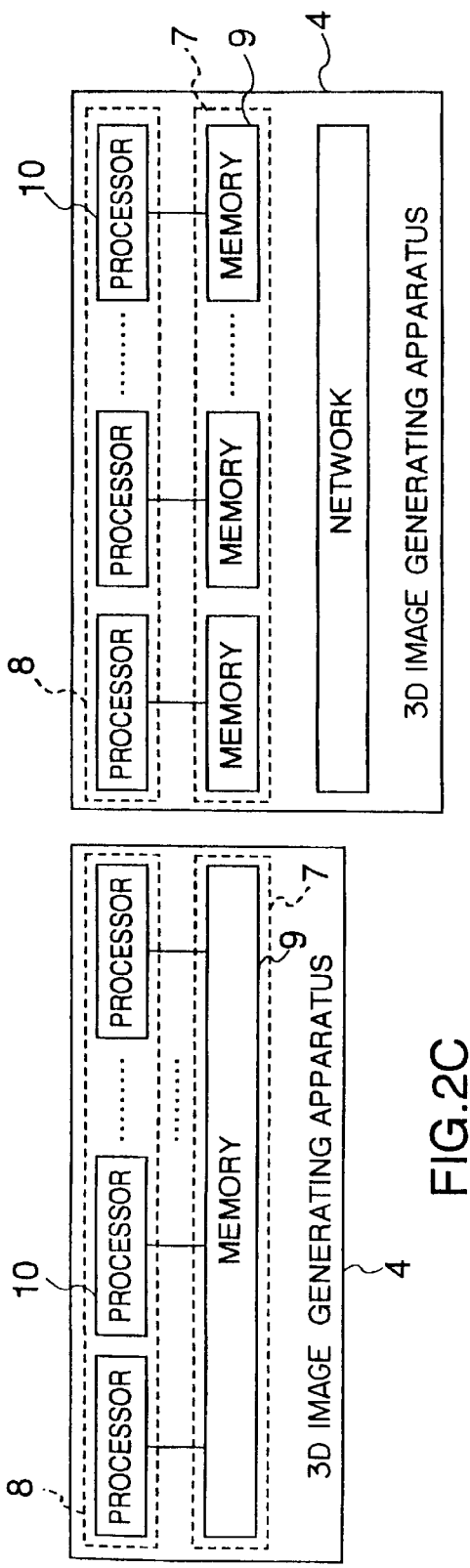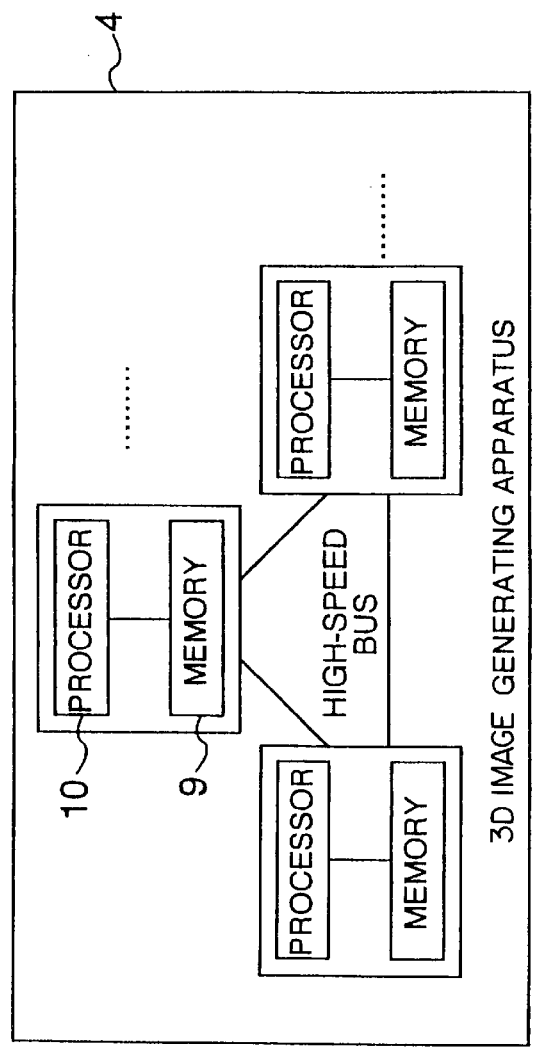

VOLUME DATA
PROJECTION PLANE

USING 4 PROCESSORS
DISPLAY OBJECT IMAGE

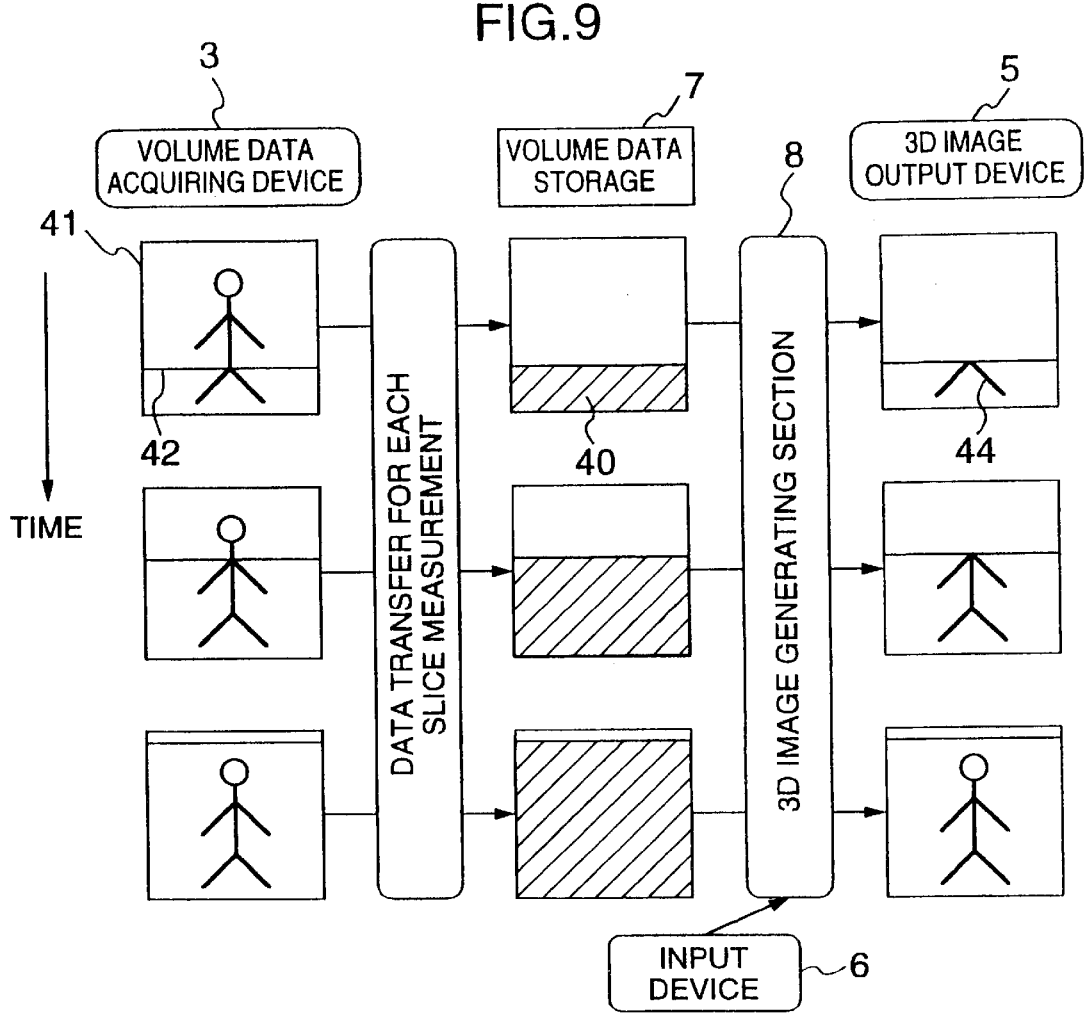
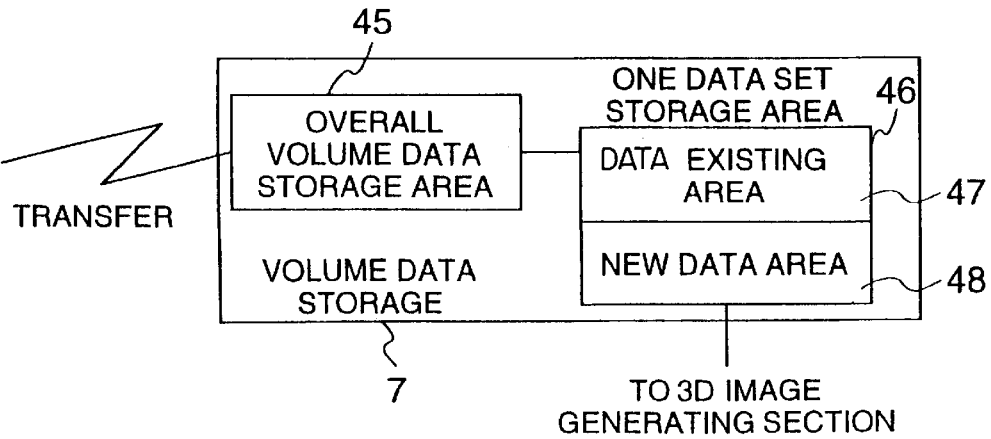

METHOD AND APPARATUS FOR DIRECTLY GENERATING THREE-DIMENSIONAL IMAGES FROM VOXEL DATA WITH DIVIDING IMAGE GENERATING PROCESSES AND UTILIZING PARALLEL PROCESSES

BACKGROUND OF THE INVENTION

The present invention relates to a three-dimensional (3D) image generating method and an apparatus using the same in which a 3D objects is projected according to volume data representing the 3D objects onto a two-dimensional (2D) plane to generate and to display the obtained 3D image, and in particular, to a 3D image generating method and an apparatus using the same in which the 3D image generating process is subdivided into two or more processes to be assigned to a plurality of processors.

The fundamental principle of the rendering method associated with the present invention has been described in the U.S. patent application Ser. No. 08/415,941 filed on Apr. 3, 1995 now U.S. Pat. No. 5,630,034 and entitled "Three-Dimensional Image Producing Method and Apparatus".

Technologies of creating 3D images have been heretofore broadly utilized in various fields including medical applications. In this connection, according to the 3D image producing technology, a 3D contour defined by values of 3D data (also called volume data) is projected onto a 2D projection plane to attain a 2D image representing the 3D picture. The resultant image is naturally of two dimensions and hence is a quasi-3D image, however, is generally called "3D image". Therefore, the term "3D image" is also used in this meaning in the present application.

The known technologies to create and to display the 3D image includes the volume rendering technology described in pages 29 to 37 of "Display of Surface from Volume Data" described by M. LeVoy in the IEEE CG & A, Vol. 8, No. 5 (1988).

According to the volume rendering technology, volume data is considered to include a set of voxels, i.e., quite small semi-transparent cuboids. For each voxel, there is defined opacity as a degree of change in the amount of light passing therethrough. In this regard, there is assumed a model in which a light emitted from a 2D projection plane passes through the volume data so as to attain the quantity or amount of light reflected by voxels due to opacity thereof, thereby attaining a projected image on the 2D plane. To calculate the reflection due to each voxel, it is assumed that a virtual surface is present at its position. The reflection is calculated as the total of the diffused reflection, mirror specular reflection, and environmental reflection. The virtual surface has a gradient called grey level gradient, which is represented by a gradient in the voxel value.

To generate the 3D image in this manner, there is required quite a long period of processing time due to, for example, the large amount of data. It has consequently been proposed to use a plurality of processors to increase the 3D generation speed.

For example, according to the technology described in pages 45 to 55 of an article entitled "Parallel Visualization Algorithms: Performance and Architectural Implication" written by Jaswinder Pal Singh et al in the "Computer" published in July 1994, the overall region of the projection plane in which pixel values are to be obtained is subdivided into as many subregions as there are processors. The pixel values are calculated by the processors for the respective subregions. In the operation, the region is further partitioned into subareas according to tasks such that when a processor assigned with a subregion completes its operation to attain all pixel values of the subregion, the processor can execute a task assigned to another processor executing another process. This resultantly equalizes the processing amounts of the respective processors and enhances the efficiency of concurrent processing.

In addition, conventionally, after 3D data is measured for one data set, the 3D image is displayed for the data set at a time. That is, when displaying a 3D image of volume data just received, one data set of the preceding volume data is completely replaced with that of the succeeding volume data.

In the 3D image display operation according to the volume rendering method, quite a large volume of calculations and computations as well as a long period of processing time are required. Using the technology of the "Parallel Visualization Algorithms" above, the process can be achieved by a plurality of processors in a distributed manner and hence the processing time is reduced as the number of processors is increased. However, the processes are not uniformly allocated to the respective processors in this method. This consequently arises a problem of a complex control operation under which each processor monitors the operating states of the other processors for the efficient process distribution.

Furthermore, in the system achieving operations ranging from acquisition of volume data to presentation of the 3D image, the image display is carried out after all data is completely received. This leads to a problem of a long period of time from when the volume data is received to when the image is displayed.

Additionally, in the replacement of volume data, the rendering parameters beforehand set to the system are restored to the original values. This means that each time the 3D image display is conducted for one data set, it is necessary to set the rendering parameters again to the system. This arises a problem that the images cannot be successively displayed when the measured volume data is sequentially received.

SUMMARY OF THE INVENTION

In consideration of the problems above, the present invention has the following objects. The processes are allocated to the associated processors so that the loads on the respective processors are immediately homogenized through a simple preprocess after data is measured. Moreover, the 3D image can be displayed without waiting for the termination of data measurement and accumulation. Thanks to this provision, the period of time ranging from the acquisition of volume data to presentation of the 3D image is minimized. In addition, there is provided a high-speed 3D image generating apparatus capable of continuously displaying images of an object changing its state in a successive fashion.

To achieve the objects above, the following points are taken into consideration in the implementation of the present invention. According to the volume rendering method, the position of the display object in the volume data space is unknown. Consequently, the computations are required to be conducted for areas in which the display object is absent. However, in a case in which data of a human body measured, for example, by an X-ray computed tomography (CT) is displayed according to the volume rendering method, when threshold values are established for opacities or the like of the human textures such that any texture having an opacity value equal to or more than the associated threshold value is set as the display object, the existing range or zone of the display object can be determined. This makes it possible to estimate the amount of calculations to create the pertinent 3D image.

To achieve the object above according to the present invention, there is provided an image generating apparatus for generating and displaying a 3D image of a display object, including volume data acquiring unit for acquiring the volume data, volume data storage unit for storing therein the acquired volume data, input unit for inputting therefrom the rendering parameters, 3D image generation process means including a plurality of processors for estimating a quantity of calculations necessary for the creation process of the 3D image according to a portion of the volume data stored in the storage unit, subdividing the generation process into sub-processes and thereby substantially equalizing the quantities of calculations respectively allocated to the plural processors, concurrently executing the sub-processes by the plural processors according to the volume data stored in the volume data storage unit and the rendering parameters inputted thereto, and generating a 3D image, and image output unit for visualizing the generated 3D image.

Furthermore, according to the present invention, the pixels constituting the projection plane are classified using a portion of the volume data into a group of pixels related to projection of the display object and a group of pixels not associated therewith. The pixels are allocated to the respective processors such that the pixels of the group related to the image projection are uniformly assigned to the processors. Each processor executes in a concurrent manner the process for the allocated pixels to generate a 3D image according to the volume data.

In the 3D image creating apparatus according to the present invention, the 3D image creating process can be divided into as many subprocesses as there are processors. In addition, the position of the target object can be identified using the voxel values of the measured data and preset threshold values. Therefore, without executing the complex process in which each processor monitors the execution states of the other processors to get a task once assigned to another processor, the processes can be almost uniformly assigned to the respective processors immediately after the data is measured.

Moreover, in the operation in which the measured volume data is displayed as a 3D image, the 3D image producing apparatus according to the present invention sequentially displays, while executing the measurement of 3D data, images of previously measured data. Therefore, the period of time ranging from the 3D data measurement to the 3D image display can be minimized.

Additionally, since the 3D image generating process is executed in concurrence with the accumulation of acquired volume data to resultantly reduce the period of time ranging from the 3D data accumulation to the first 3D image creation, an image of an object changing its state in a successive manner can be continuously displayed without any interruption of the display image.

BRIEF DESCRIPTION OF THE DRAWINGS

These and other objects and advantages of the present invention will become apparent by reference to the following description and accompanying drawings wherein:

FIGS. 2A to 2C are diagrams showing examples of constitution of the apparatus of FIG. 1;

FIG. 9 is a diagram showing processes in time series according to the present invention;

FIG. 10 is a diagram showing an example of structure of a volume data storage of FIG. 1;

DESCRIPTION OF THE PREFERRED EMBODIMENTS

Description will be next given of a first embodiment of the 3D image generating apparatus according to the present invention.

Figure 1:
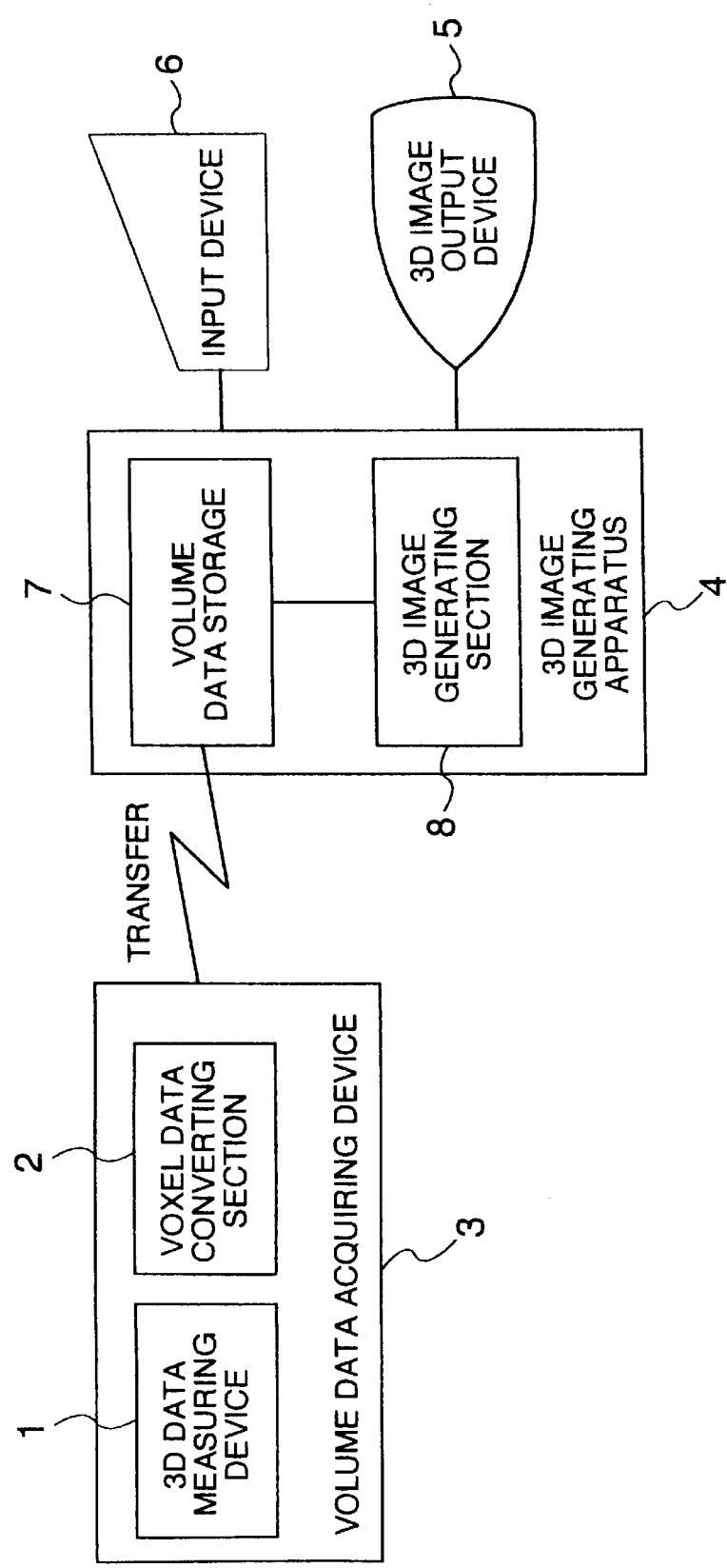
FIG. 1 is a diagram schematically showing the configuration of an embodiment of the 3D image generating apparatus according to the present invention.

FIG. 1 shows an example of structure of a system including the 3D image generating apparatus according to the present invention. A 3D data measuring device 1 is provided to measure 3D data such as data of contours and luster of an actual 3D body as an object of image generation. The apparatus 1 may include, for example, an X-ray CT apparatus and/or a magnetic resonance imaging (MRI) facility. A voxel data converting section 2 converts the measured 3D data into voxel data. A volume data acquiring device 3 includes the 3D data measuring device 1 and the voxel data converting device 2. A 3D image generating apparatus 4 includes a volume data storage 7 and 3D image generating section 8 to generate a 3D image according to volume data transferred from the volume data acquiring device 3 and parameters supplied from an input device 6, thereby sending the resultant image to a 3D image output device 5. The device 5 visualizes the generated 3D image and may include, for example, a display. The input device 6 is used to input parameters and the like to be used in the generation of 3D images. The device 6 may includes such devices as a keyboard and a mouse. The volume data storage 7 is employed to store therein volume data transferred from the volume data acquiring device 3 in an online or offline fashion. The 3D image generating section 8 generates a 3D image from data stored in the storage 7.

FIGS. 2A to 2C show examples of constitution of the 3D image generating device 4, namely, the tight coupling type, cluster coupling type, and super-parallel type, respectively. A plurality of memories 9 are included in the volume data storage 7, whereas a plurality of processor 10 are included in the 3D image generating section 8.

Figure 3A:
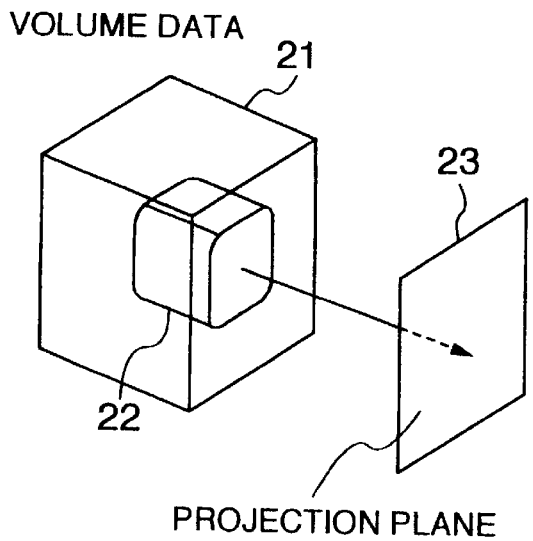
FIGS. 3A and 3B are diagrams showing an example of process subdivision in the 3D image creation process according to the present invention.
Figure 3B:
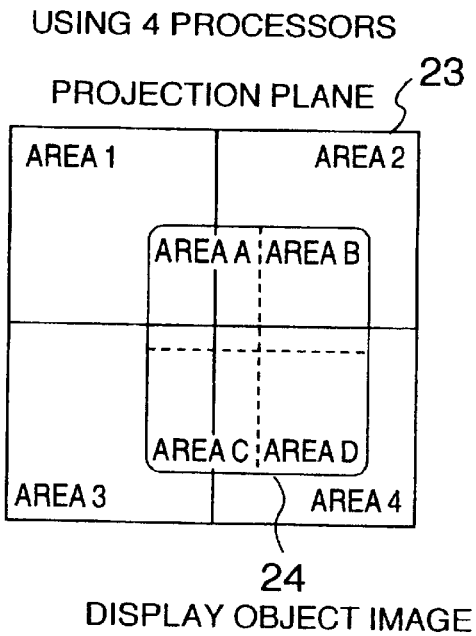

FIGS. 3A and 3B show process areas to be allocated to the respective processors in the 3D image creation. In FIG. 3A, a volume data space 21 schematically shows acquired volume data which includes a display object 22 specified by inputted rendering parameters. In FIG. 3B, a projection plane 23 is a plane onto which a 3D image associated with the volume data space 21 is projected. In FIG. 3A, it is assumed that a viewing point is on the front side of the projection plane 23 and a viewing direction which is perpendicular to the plane 23 and which is drawn from the plane 23 to the volume data space 21. A display object image 24 is an image of a display object 22 projected onto the plane 23.

Figure 4:
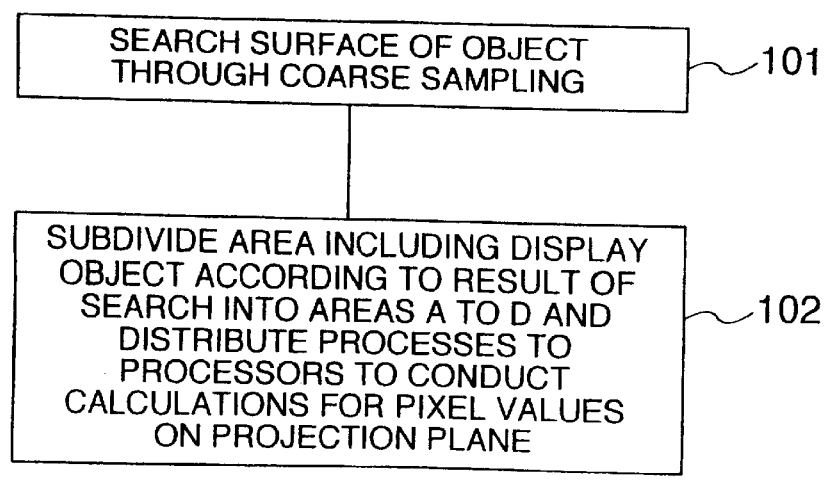
FIG. 4 is a flowchart showing a method of process subdivision in the 3D image creation process of FIG. 3.

FIG. 4 is a flowchart of the allocation of process areas of FIGS. 3A and 3B and includes a surface position search process 101 to make a search for a position of the display object 22 on the surface and a process area division process 102 which identifies an existing area of the display object image 24 according to the search result and which subdivides the area into subareas to be allocated to the processors 10.

Figure 5:
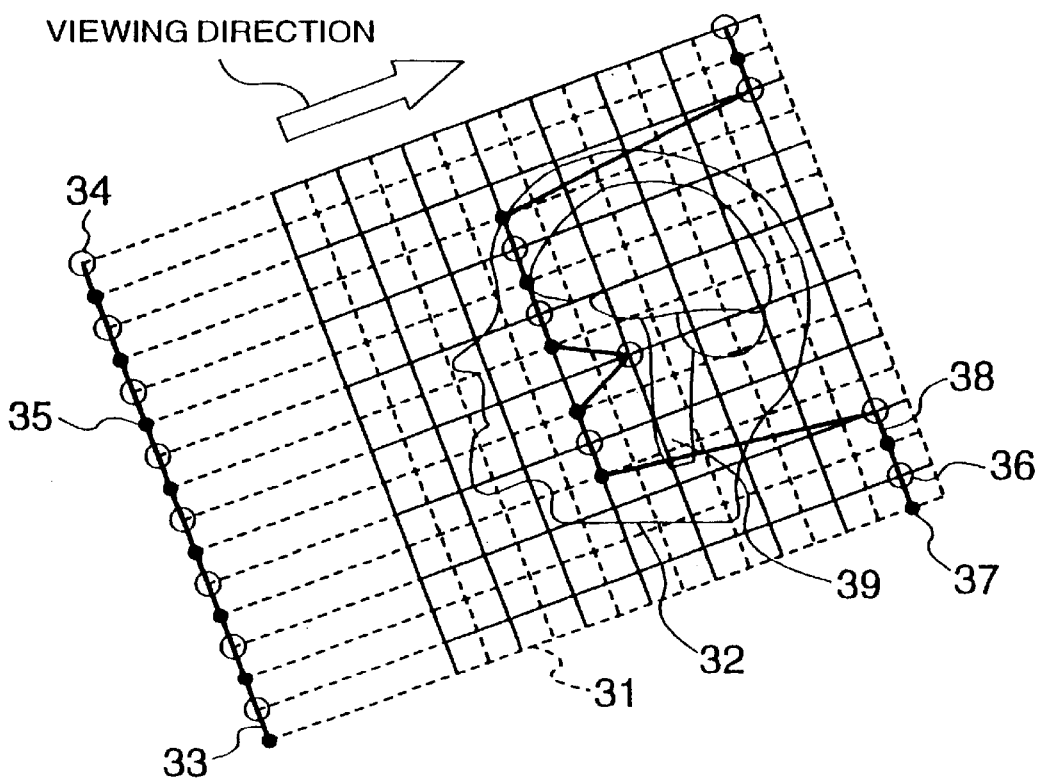
FIG. 5 is a diagram for explaining a surface search of an object according to FIG. 4 in a simplified example of a 2D image.

FIG. 5 is a diagram for explaining the search process 101 of FIG. 4. For simplification, description will be given of the process on one cross section of the volume data space 21. However, the process is actually executed in a 3D fashion. A coordinate space 31 is obtained by rotating a coordinate space stipulating the volume data space 21, and voxel values at points of coordinates are obtained by interpolation. A measurement object 32 is an object (a human head in this case) to be measured by the 3D data measuring device 1. A line 33 indicates a projection plane 23. A small circle 34 drawn on the line 33 represents a point of coordinates for which the system first searches for a surface of a brain area 39 as the display object. A small solid circle 35 drawn on the line 33 stands for a point of coordinates for which the system decides a position of the display object 22 on the surface by interpolation. A circle 36 indicated on the line 38 denotes the surface position of the display object 22 resultant from the first search. A solid circle 37 on the line 38 designates the surface position of the object 22 obtained by interpolation.

Figure 6:
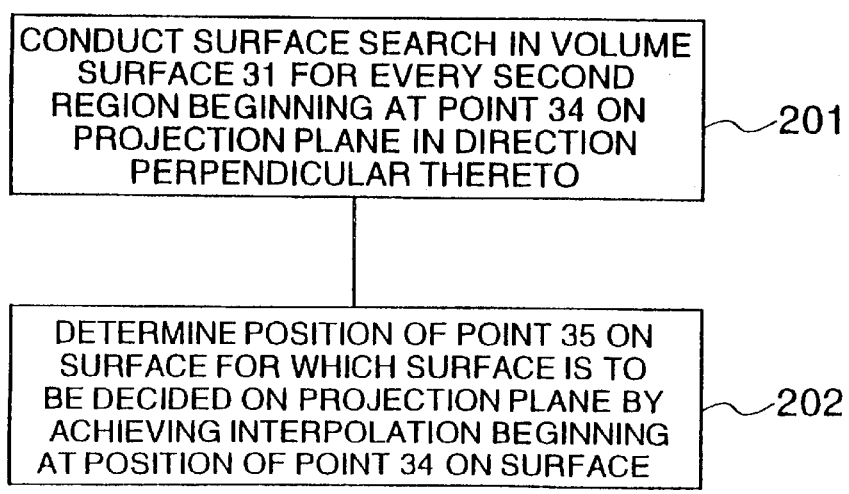
FIG. 6 is a flowchart showing the surface search of an object in relation to FIG. 5.

FIG. 6 is a flowchart showing in detail the surface position search process 101 of FIG. 4 and includes a search process 201 and an interpolation process 202.

Subsequently, operation of the embodiment of the high-speed 3D image generating apparatus will be described by referring to FIG. 1 and FIGS. 2A to 2C, 3A and 3B, and 4 to 6.

The 3D data obtained by the 3D data measuring device 1 is converted by the voxel data converter 2 into volume data including voxel data. The volume data is transferred to the 3D image generator 4 in an online system using a network or in an offline system employing a media such as a opto-magnetic disk or a magnetic tape. The received volume data is stored in the volume data storage 7. The 3D image generator 8 creates 3D image from the volume data accumulated in the storage 7 and rendering parameters supplied from the input device 6. The produced 3D image is visualized by the 3D image output device 5.

As can be seen from FIGS. 2A to 2C, the 3D image generator 4 of the present embodiment is a multiprocessor system in which any processor 10 can access the memory 9 to reference data stored therein. This embodiment includes four processors 10.

According to the rendering parameters inputted from the input device 6, the display object 22 is determined in the volume data. In association therewith, there is identified an area of the display object image 24. When the area of the display object image 24 is determined, it is only necessary to conduct the 3D image generating calculation only for the area. Consequently, the quantity of calculations can be estimated.

In the operation, the 3D image generator 8 scans the volume data space 21 in a direction from the projection screen to the deeper position to execute a search for an area in which the display object 22 exists. In the scanning process, the search is effected at an interval larger than an interval of points of coordinates on the projection plane for which the 3D image creation is necessary. Namely, a coarse high-speed scanning operation is conducted to make a search for a position of the display object on the surface (step 101). Referring to FIG. 5, the surface search will be described according to the flowchart of FIG. 6.

Consider a case in which a brain area 39 is decided as the display object according to rendering parameters including threshold values. For the points indicated by circles 34 respectively related to every second coordinates on the line 33, a coarse sampling operation is carried out in the coordinate space 31 along the direction indicated by each solid line to effect the search for the display object 22 on a side near the projection plane. In this situation, voxel values of the respective points of coordinates in the coordinate space 31 are assumed to be obtained by a nearest neighborhood interpolation. For each point denoted by circle 34 on the line 33, a search is made through the coordinate space 31 in the vertical direction to attain a point designated by circle 36 representing a surface position of the display object 22 (step 201).

Next, for the points of solid circles 35 which are respectively associated with every second coordinates and for which surface positions of the object 22 have not been obtained, the system calculates surface positions. Of the point of circles 36 corresponding to the points of circles 34 adjacent to the point of solid circle 35, the system selects the point of circle 36 on the front side to achieve an interpolation so as to determine a point of solid circle 37 denoting a display position of the object 22 (step 202).

As above, the surface position search 101 is carried out for all points of coordinates on the lines 33, namely, on the projection plane 23 so as to resultantly decide the area of the display object image 24 in the projection plane 23.

In this situation, the area of the display object image 24 is equally divided into four subareas according to the number of processors 10. Values of pixels respectively projected onto the subareas A to D are calculated by the processors 10 respectively related thereto (step 102).

Figure 7:
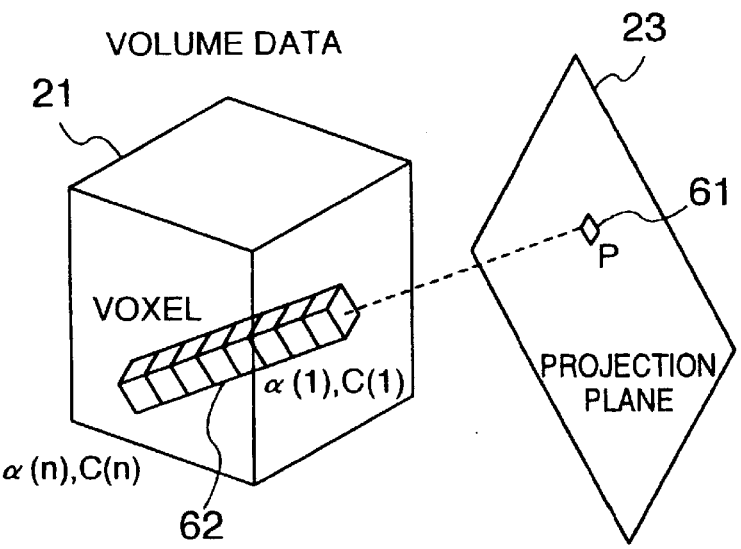
FIG. 7 is a diagram for explaining the principle of the 3D image generating process according to the present invention.

FIG. 7 is a diagram for explaining the method of calculating the values of pixels for the data projection.

A pixel 61 represents a pixel for which a value to be projected on the projection plane 23 is now calculated. A voxel string 62 is a set of re-sampled voxels existing on a line drawn from the pixel 61, the line being perpendicular to the projection plane.

Each voxel in the voxel series 62 is specified by a pair of two variables including opacity α and color c. Opacity α designates a degree of attenuation of light through the cell. Opacity α takes a value "0" when the cell is completely transparent and hence the light completely passes therethrough and a value "1" when the cell is completely opaque and hence the light does not pass therethrough at all. Color c stand for a color emitted from the voxel and is determined as follows. For the color possessed by the voxel, the shading is effected according to the directions respectively of the light source and projection plane in consideration of the light reflection on the virtual surface at the voxel position. Opacity α and color c can be arbitrarily defined in association with the voxel data values (to be referred to as voxel values herebelow) of the measured 3D data.

Assume that the voxels of the voxel series 62 are numbered in a direction from the position nearest to the projection plane to the position farthest thereto in this order and opacity α and color c of the respective voxels are expressed as α(1), c(1), . . . , α(n), c(n). Under the condition, the value P projected onto the the pixel 61 is calculated according to the volume rendering method.

Assume that when the light from the projection plane enters voxels, the light propagates through the voxel series 62 from the voxel nearest to the projection plane to that farthest thereto. According to expression (1), the projection value Pn is attained by accumulating the quantity of reflection of light caused by each voxel.

$$Pn = \sum_{i=1}^{n} \alpha(i) \cdot \beta(i) \cdot A(i) \quad (1)$$

$$A(i) = \prod_{j=1}^{i=1} (1 - \alpha(j))$$

$$A(1) = 1$$

In expression (1), A(i) stands for the transmission factor of light incident to i-th voxel.

Assuming the surface position beforehand calculated for the display object 22 corresponds to the first voxel, the projection value is obtained according to expression (1). In this regard, when a condition A(i) ≈0 holds, its is assumed that the light does not pass therethrough any more and hence the calculation process is terminated.

According to the embodiment, the area of projection of the display object 22 can be identified at a high speed by accomplishing the surface position search process 101. Subdividing the area into substantially equal subareas to be allocated to the respective processors 10, the loads respectively imposed on the processors 10 to generate the 3D image can be almost homogenized. In consequence, it is possible to execute the process at a high speed by efficiently using the multiprocessor system.

In the embodiment, the search process 201 is accomplished for every second coordinate point for the following reasons. It is assumed that an object having the size of one voxel is assumed to be a noise and hence there does not exist a plane possessing the thickness of one voxel. If the ignorable voxel size is increased, the surface search can be achieved by executing the sampling at a coarser coordinate interval, which advantageously increases the processing speed. On the other hand, when an object having the size of one voxel is not ignorable, it is necessary to effect the search for the overall coordinate space.

Furthermore, in the interpolation process 202 of the embodiment, as the method of interpolating the point of solid circle 37 according to the points of circles 36 on the line 39, there is adopted an interpolation method in which the position of one of the points of circles 34 adjacent to the point of solid circle 35 is directly utilized for the calculation. However, there may also be employed a method of linearly interpolating the point 37 according to the points 34 in the periphery of the point 35.

Additionally, the image generation speed can be increased by dividing the surface position search process 101 to appropriately distribute the divided processes to the respective processors. As shown in FIG. 3B, the projection plane 23 is almost equally divided into as many subareas as there are processors to allocate the surface search of areas 1 to 4 to the respective processors. The load on each processor varies depending on the position of the display object in this case. However, since the volume of calculation of the process is less than that of calculation to generate the 3D image, only a little non-uniformity may take in the loads imposed on the respective processors.

Figure 8A:
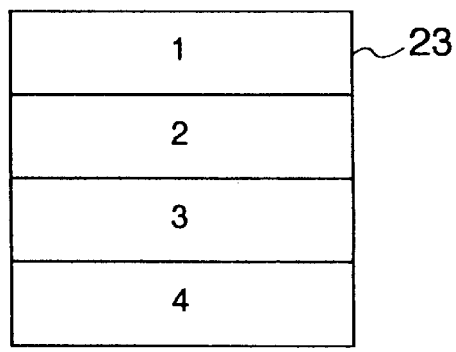
FIGS. 8A to 8D are diagrams schematically showing the process division method in another process according to the present invention.
Figure 8B:
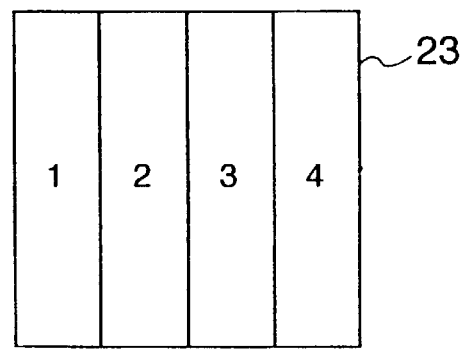
Figure 8C:
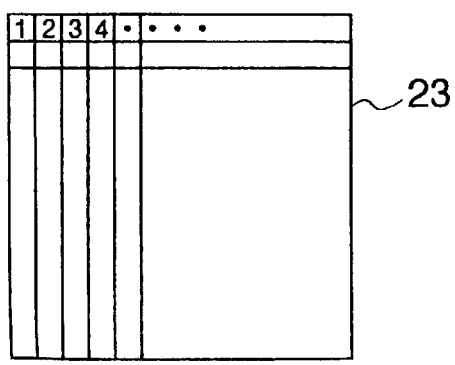
Figure 8D:
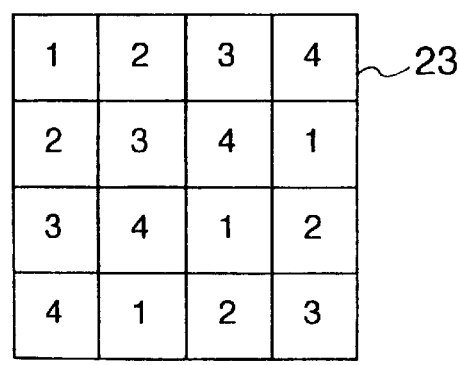

Incidentally, in the embodiment above, the area of the projection plane for the surface search and the area of the display object image 24 are respectively subdivided into two subareas in the horizontal and vertical directions. However, the present invention is not limited to this area division. Namely, any other division method is available only if the area is substantially equally divided. For example, as shown in FIGS. 8A to 8D, there may be adopted various kinds of area division including the horizontal division (FIG. 8A), vertical division (FIG. 8B), circulating division according to adjacent coordinates (FIG. 8C), and block-unit division (FIG. 8D). Moreover, the display object image need not be one continuous area but may include separated areas.

Description will be given of a method of exactly estimating the amount of calculations in the 3D image generation according to the present embodiment. In the embodiment, the volume of calculation is estimated according to the area in which the display object 22 exists to thereby equally divided the existing area of the display object image 24. However, the amounts of the pixels 61 in the respective areas are not necessarily equal to each other for the following reasons. That is, the amount of calculations in which the projection value of each pixel 61 is obtained depends on opacity α of the voxel series 62 of the display object 22.

On this occasion, using opacity α(1) of the surface voxel at the position on the surface beforehand attained for the display object 22, it is possible to more exactly estimate the amount of calculations. First, for the overall pixels of the display object associated with surface positions of the display object 22, there is obtained the total Q of opacity α(1) of each surface voxel related thereto. Subsequently, the surface object pixels are classified into four groups according to the number of processors. In the operation, the division is effected such that the total of opacity α(1) of the surface voxels in each group is substantially equal to Q/4. With provision of operation in which the calculation of projection value for each group is divided and assigned to the each associated processor 10, the calculation volume can be almost uniformly divided.

Incidentally, although the present embodiment employs the above method as means to estimate the calculation quantity of the 3D image generation process, the present invention is not restricted by the above method. There may be adopted a method of estimating the amount of calculations according to that obtained when the projection values are first calculated for several points at arbitrary positions on the projection plane 23 or a method in which there is created a table of existing areas for each display object 22 so as to estimate the amount of calculations according to the display object 22.

In addition, allocated to each processor is not only the projection calculation process thus divided. Namely, any process necessary for the 3D image generation process, for example, the segmentation and region extraction can be divided to be allocated to the processors.

Moreover, the multiprocessor configuration of the embodiment is as shown in FIGS. 2A to 2C. However, the present invention is not limited to this configuration. Namely, any configuration is available only if the memory 9 in which the volume data exists can be accessed from any processors 10.

Additionally, the volume data acquiring device 3 of the embodiment includes the 3D data measuring device 1 and voxel data converting section 2, which however does not restrict the present invention. Namely, there may be utilized an apparatus to directly acquire volume data resultant from a numerical analysis of hydrodynamics or a facility to create volume data including voxel data. Consequently, there may be employed an apparatus in which the volume data acquiring device 3 and the 3D image generating device are implemented in a single unit.

Subsequently, the second embodiment will be described according to the present invention. In conjunction with the second embodiment, there will be described an example of a high-speed process ranging from the data measurement to the image display.

FIG. 9 shows the processes executed in time series to achieve operations ranging from the volume data measurement to the 3D image display. An area 41 indicates a range of the measurement object including the display object 22 (a human body in this case). A line 42 denotes a position of a cross section during the measurement by the 3D measuring device 1. The device 1 accomplishes operations ranging from the 3D data measurement to the reconfiguration of image data. In addition, a shade portion 40 designates volume data transferred to the volume data storage 7. An area 44 stands for a 3D image sent to the 3D image output device 5.

By referring to FIG. 9, description will be now given of operation of the high-speed 3D generating apparatus of the embodiment. The volume data storing method will be described in detail later and hence will be briefly explained in the following description.

The volume data acquiring device 3 measures data of the display object in the range of the area 41 while sequentially moving upward the cross section of measurement indicated by the line 42. The device 3 transforms the measured 3D data into image data including voxel data and then transfers the data of each cross section of measurement to the volume data storage 7.

The 3D image generating section 8 projects the latest volume data set from the storage device 7 onto the projection plane 23. The data projection is achieved according to the rendering parameters received from the input device 6. Moreover, the data projection is conducted each transfer of the measured data of one cross section. When the pertinent rendering parameters are missing in the situation, the default values are employed for the data projection.

During the execution of calculations related to the 3D image generation by the 3D image generating section 8, when an indication of change in the rendering parameters is supplied from the input device 6, the section 8 executes again the calculations of the 3D image creation beginning at the starting point thereof. In the operation, the calculations are accomplished using the latest volume data set.

In the embodiment, the 3D data measurement is executed in concurrence with the 3D image generation process to resultantly reduce the period of time ranging from the 3D data measurement to the 3D image visualization. Additionally, in response to an input of modification of rendering parameters during the execution of the 3D image generation process, there can be achieved various processes, for example, to cut the objects in the latest volume data and to change the display area according to voxel values.

In the paragraphs above, the volume data storage 7 of the embodiment has been briefly described. Next, referring to FIGS. 10 and 11, operation of the storage 7 will be described in detail.

FIG. 10 shows the internal storage area of the volume data storage 7. Accumulated in an overall volume data storage area 45 is the overall volume data transferred thereto. A one data set storage area 46 is used to store therein one data set including a set of data necessary to create one display object image and is accessed by the 3D image generating section 8. In a data existing area 47, there already exists data. On the other hand, a new data area 48 is provided to write therein new data items. In this case, the volume data is assumed to be processed in the unit of one cross section measured. For example, the data is transferred to and is written in the memory in the data processing unit. However, the processing unit may be arbitrarily specified. For the volume data, a file name may be assigned to each set including a sequence of measured data items such that the respective data sets are stored in the total volume data storage area 45 in the separated fashion. Furthermore, only the necessary volume data is required to be stored in the storage area 45, namely, any other unnecessary data can be cleared.

Figure 11:
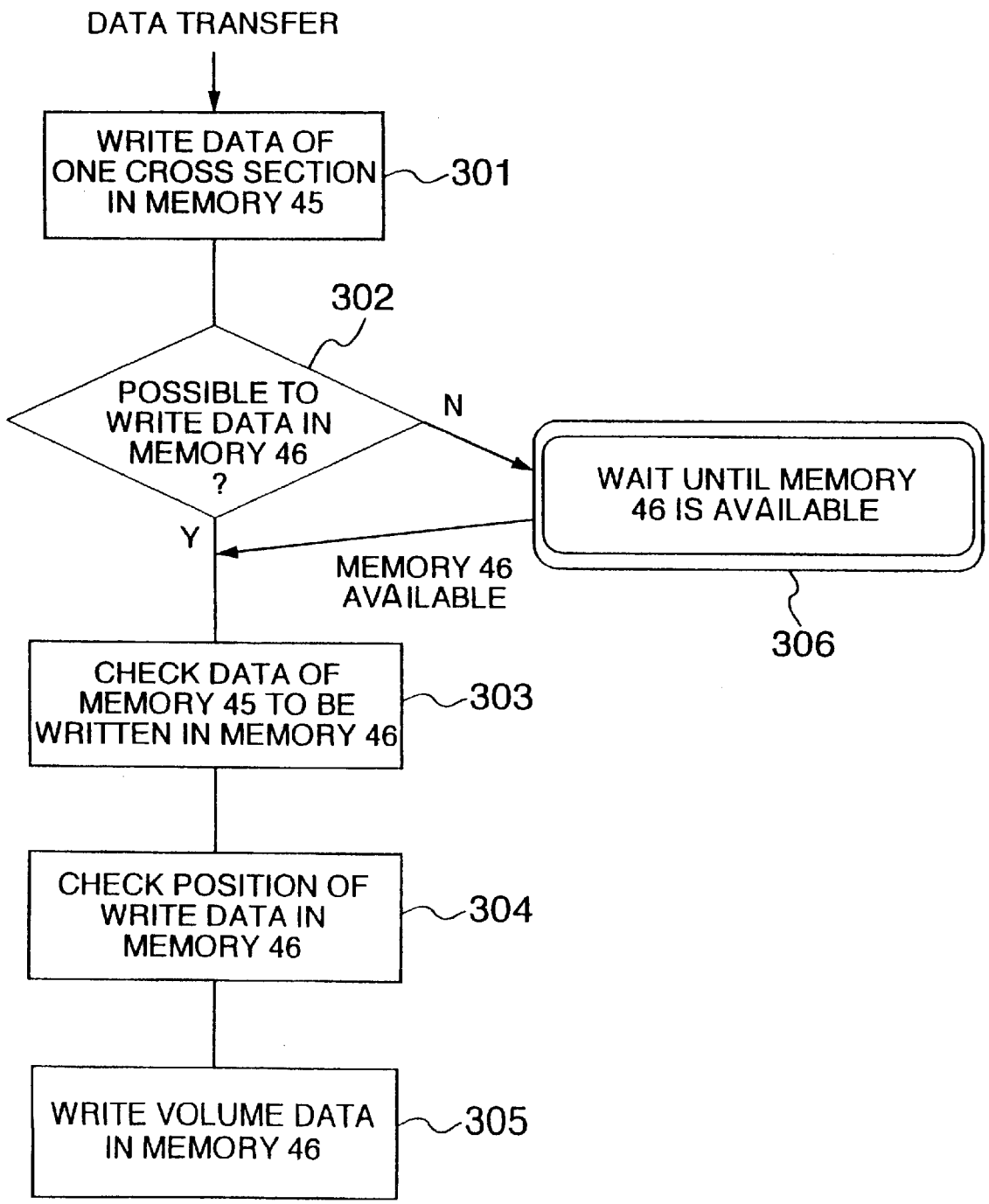
FIG. 11 is a flowchart as an embodiment of the data storage method employing the volume data storage of FIG. 10.

FIG. 11 is a flowchart showing a method of controlling the storage area of FIG. 10. When volume data of one cross section is measured, the obtained data is transferred to and is written in the overall volume data storage area 45 (step 301). Thereafter, a check is made to decide whether or not the one data set storage area 46 is available for the data write operation (step 302). If available, the data of the storage area 45 is checked to determine whether or not there exists any data to be written in the storage area 46 (step 303). For the data indicated to be stored in the area 46 in step 303, a position is decided in the storage area 46 (step 304). The data is written in the memory 46 at the position obtained in step 304 (step 305). When the area 46 is unavailable for the write operation, the write step is set to and kept in the wait state until the area 46 becomes available (step 306). During the wait state, other data items are possibly transferred to the overall volume data storage area 45. For these data items, control is similarly passed from step 302 to step 306. In the wait state of step 306, the write availability of the one data set storage area 46 is monitored in a successive fashion such that when the area 46 becomes available, control is passed to step 303. The availability may be determined, for example, by monitoring the write enable interruption. Or, control may be transferred to step 302 at a predetermined constant interval of time. When the write availability is determined by the availability check at data transfer termination, the data in the wait state is restored and then control is immediately transferred to step 303.

As above, the 3D image generating section 8 is enabled to access one data set including the current volume data so as to create the latest 3D image according to the specified rendering parameters.

In addition, steps 304 and 305 are especially efficient to continuously measure the same object several times. Since the storage area 46 is reserved for only one data set, when the data set is replaced with another data, data items of the data set sequentially received are substituted for the existing data items in the area 46 at the associated positions in a sequential fashion. According to this method, when producing an image of a display object changing its state in time series, for example, in an angiographic process, the volume data items are sequentially updated to the data items last measured. This makes the observer of the object successively check the change in the state of the object in time series.

Figure 12:
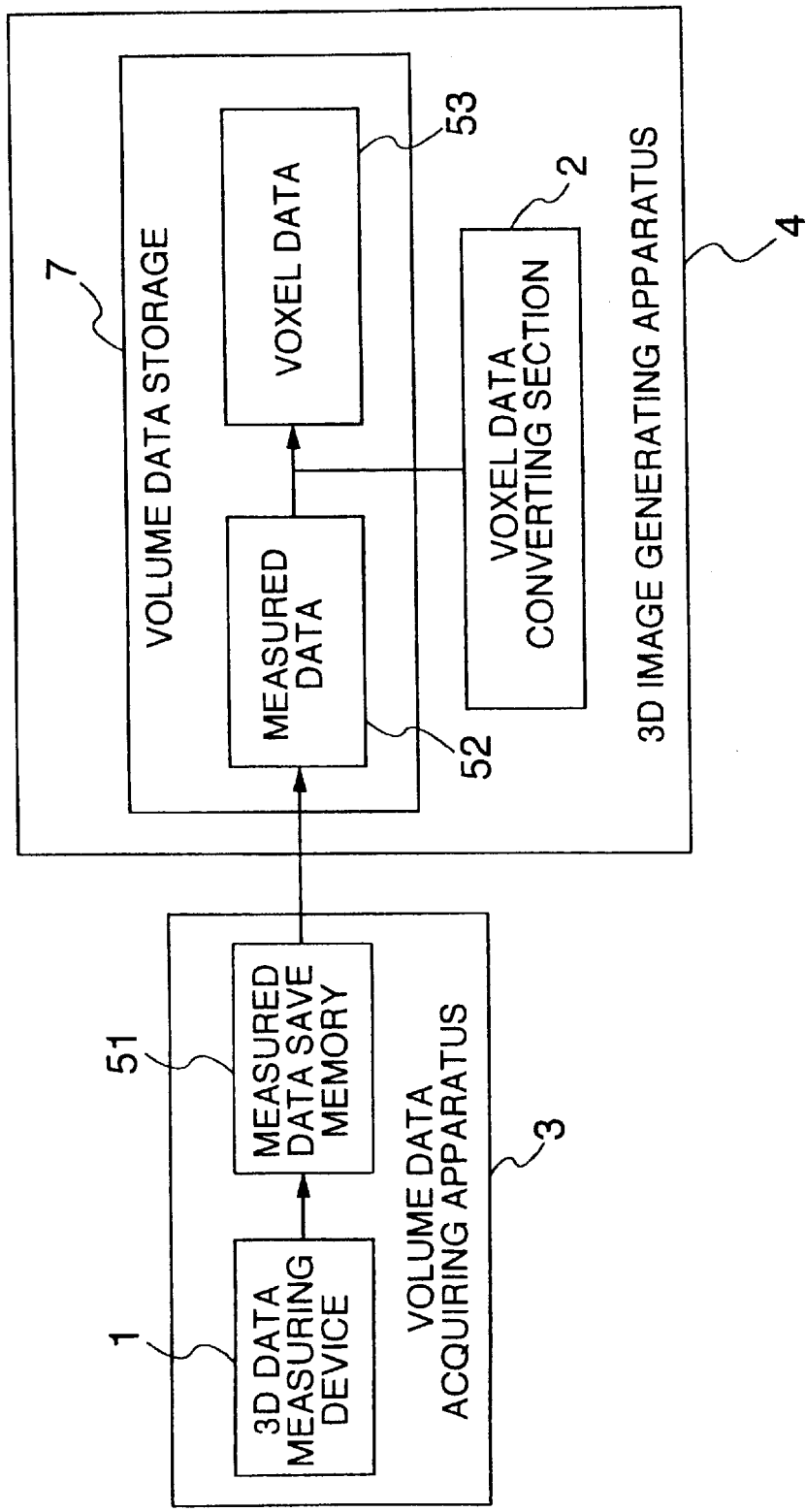
FIG. 12 is a diagram partially showing an example of constitution of the apparatus of FIG. 1.

According to the embodiment, the conversion of measured data into voxel data is carried out by the volume data acquiring device 3 shown in FIG. 1. This however does not restrict the present invention. As can be seen from FIG. 12, there may be provided a voxel data conversion section 2 in the 3D image generating device 4 such that the measured data 52 is transformed into the voxel data 53 in the 3D image generating device 4.

Referring now to FIG. 9, description will be given of a case in which the projection plane is fixed to be perpendicular to the center axis to measure volume data in the embodiment.

Assume that the projection plane is in front of the measurement object of the area 41 as presented by the 3D image output device 5. When one cross section of measured volume data is completely received, the 3D image generating section 8 conducts the 3D image generation process for the current cross section and a cross section previously measured. However, when only the data of the first cross section is received, the section 8 does not conduct the image generation process. The area thus calculated for these cross sections is again displayed on the output device 5. This is because the gradient in voxel values, namely, the voxel value difference is to be used in the volume rendering stage.

As above, in response to each transfer of data measured for one cross section, the generating section 8 creates a 3D image for two cross sections and then displays the image on the output device 5. According to the embodiment, since it is possible to remarkably reduce the amount of calculations effected to generate a 3D image each time volume data is transferred, the period of time to be lapsed before the 3D image is outputted is minimized. However, when an indication is supplied from the input device 6 to modify rendering parameters, the calculations are again conducted for the entire projection plane according to the latest set of volume data.

Subsequently, description will be given of a method of generating a 3D image at a high speed. In this method, the positional relationship between the projection plane 23 and volume data space 21 is fixed such that when new volume data is received, a calculating scheme is selected according to the positional relationship to thereby produce a 3D image according to an existing 3D image beforehand generated and the new volume data.

Referring first to FIG. 7, description will be given of two calculating methods for use in the 3D image creation. The above method of conducting calculations for the voxels beginning at the voxel next to the projection plane 23 according to expression (1) is called "front-to-back method". In contrast thereto, a method in which light emitted from the voxel most apart from the projection plane 23 is incident to the voxel less apart therefrom such that the light emitted from the voxel which is next to the projection plane 23 in the voxel series 62 is projected thereonto is called "back-to-front method". In this method, the calculations are accomplished according to a recursive formula as follows.

$$t: n - 1 \rightarrow 1 \quad (2)$$
$$C_t = C_{t+1} \cdot (1 - \alpha(t)) + c(t) \cdot \alpha(t)$$
$$P = C_1$$

In expression (2), Ct indicates the intensity of light emitted from the t-th voxel in the voxels numbered in the ascending order beginning at the voxel next to the projection plane 23. In the operation, the light passing through the voxels is attenuated due to the degree of non-transparency of each voxel.

Figure 13A:
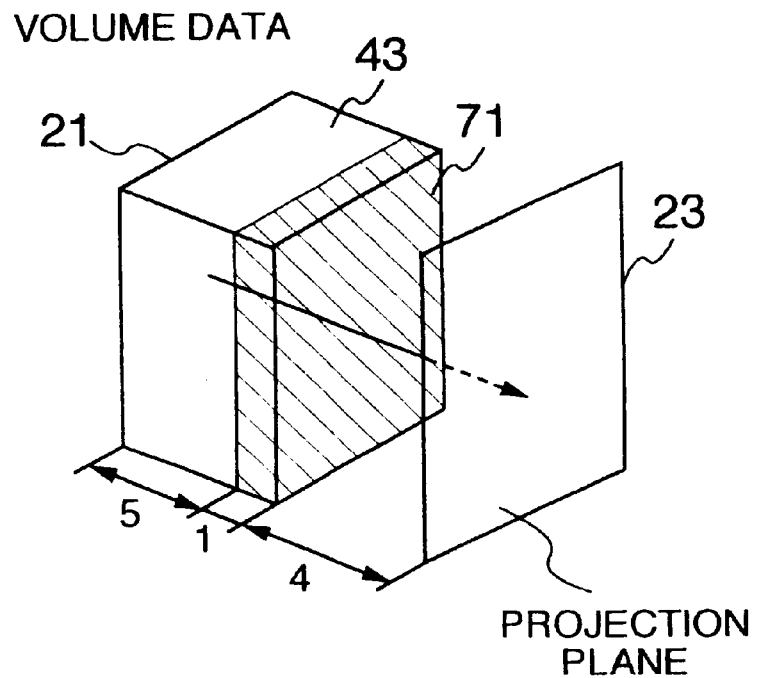
FIGS. 13A and 13B are diagrams showing relationships between volume data and projection planes according to the present invention.
Figure 13B:
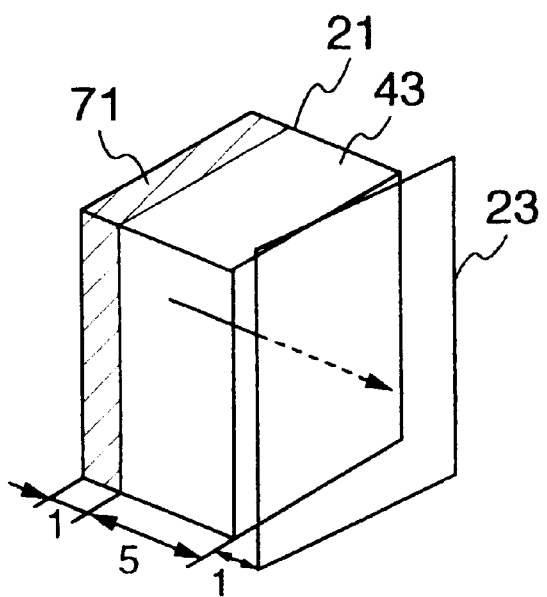

FIGS. 13A and 13B show a method of achieving a high-speed 3D image creation appropriately and selectively employing the two kinds of calculation methods above. As shown in FIG. 13A, when the positional relationship between the volume data space 21 and the projection plane 23 is fixed (i.e., the angle between the viewing direction and the data accumulating direction is more than 90 degrees and not exceeding 180 degrees) to transfer new volume data 71 to a position between existing volume data 43 beforehand accumulated and the projection plane 23, the the back-to-front method is adopted to conduct calculations for the 3D image generation. On the contrary, as can be seen from FIG. 13B, when the positional relationship between the volume data space 21 and the projection plane 23 is fixed (i.e., the angle between the viewing direction and the data accumulating direction is more than 0 degree and less than 90 degrees) in order to prevent the new volume data 71 from being inserted between the existing volume data 43 and the projection plane 23, there is adopted the front-to-back method to effect calculations for the creation of 3D images.

When the angle between the viewing direction and the data accumulating direction is 90 degrees, either of the processing when the angle is more than 90 degrees or the processing when the angle is less than 90 degrees can be applied.

When new volume data 71 is transferred in a state associated with the positional relationship shown in FIG. 13A such that voxels ranging from voxel 0 to voxel n' (n'<0) are projected onto pixel 61 on the projection plane 23, the new projection value P' is obtained using expression (3) according to C2 calculated when a 3D image is generated, voxel values α(1), c(1) of existing volume data, and voxel values α(0), c(0), . . . , α(n'), c(n'). In the computation, like C2, the value of C1 has already been calculated. However, since the voxel density gradient between voxel 0 and voxel 1 is changed due to arrival of voxel 0, the value of C1 is also required to be altered. The value of C1 is calculated using C2 as follows.

$$t: 1 \rightarrow n'(n' < 0) \quad (3)$$
$$C_t = C_{t+1} \cdot (1 - \alpha(t)) + c(t) \cdot \alpha(t)$$
$$P' = C_{n'}$$

According to the positional relationship of FIG. 13B, when the new volume data 71 is transferred such that voxels ranging from voxel (n+1) to voxel n' are projected onto the pixel 61 on the projection plane 23, the new projection value P' is calculated using expression (4) according to Pn−1 already obtained during the 3D image creation, transmission factor A(n−1) of light incident to voxel (n−1), voxel values α(n−1), α(n), c(n), and voxel values α(n+1), c(n+1), . . . , α(n') c(n'). In the calculation, like the value A(n−1), the value of A(n) has already been calculated. However, when the (n+1)-th voxel value arrives, the voxel density gradient between voxel n and voxel (n+1) and hence the value of A(n) is required to be accordingly altered. The value of A(n) is obtained from A(n−1) as follows.

$$P' = P_{n+1} + \sum_{i=n}^{n'} \alpha(i) \cdot \beta(i) \cdot A(i) \quad (4)$$

$$A(i) = A(n-1) \cdot \prod_{j=n-1}^{i-1} (1 - \alpha(j))$$

In the operation, however, when $A(i) \approx 0$ in the i-th voxel, it is assumed that the light does not path therethrough and the calculation of the pixel is terminated.

Description will be given of examples of the procedure to execute the calculation above. First, a calculation procedure using the back-to-front method will be described by referring to FIGS. 13A, 14, and 15.

FIG. 13A shows the relationship between the projection plane and volume data when the back-to-front method is adopted for the computation. For simplicity of explanation, assume that the projection plane 23 is parallel to the volume data 21, the relative magnitude in the drawing of distance between the existing volume data 43 and projection plane 23 is 5 (unit is "voxels", but it is generally omitted), and the relative size of depth of the data 43 is 5. Moreover, assume that in a state in which projection plane 23 and the volume data 21 are fixed in position as shown in FIG. 13A, the existing volume data 43 has already projected and hence a 3D image has been created and the new volume data 71 is received under the condition.

Figure 14:
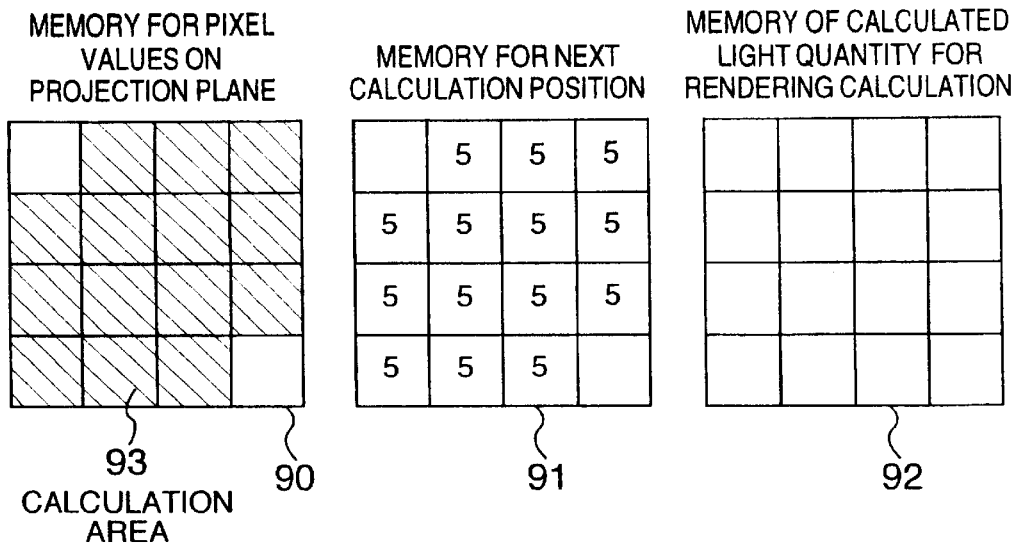
FIG. 14 is a diagram showing an example of memories necessary when a back-to-front method is implemented.

FIG. 14 shows the memory areas necessary to obtain projection values. A projection plane pixel value memory 90 is used to store therein values of the respective pixels on the projection plane. A next calculating position memory 91 is arranged to store therein the depth value of the next voxel to be calculated. The initial value thereof is the depth value of volume data most apart from the projection plane 23. A calculated light quantity memory 92 is disposed to store therein the value of calculated light quantity C necessary for expression (3). A calculation area 93 is adopted as a projection area for the projection of volume data 21, and the rendering calculation is carried out only for the area.

Figure 15:
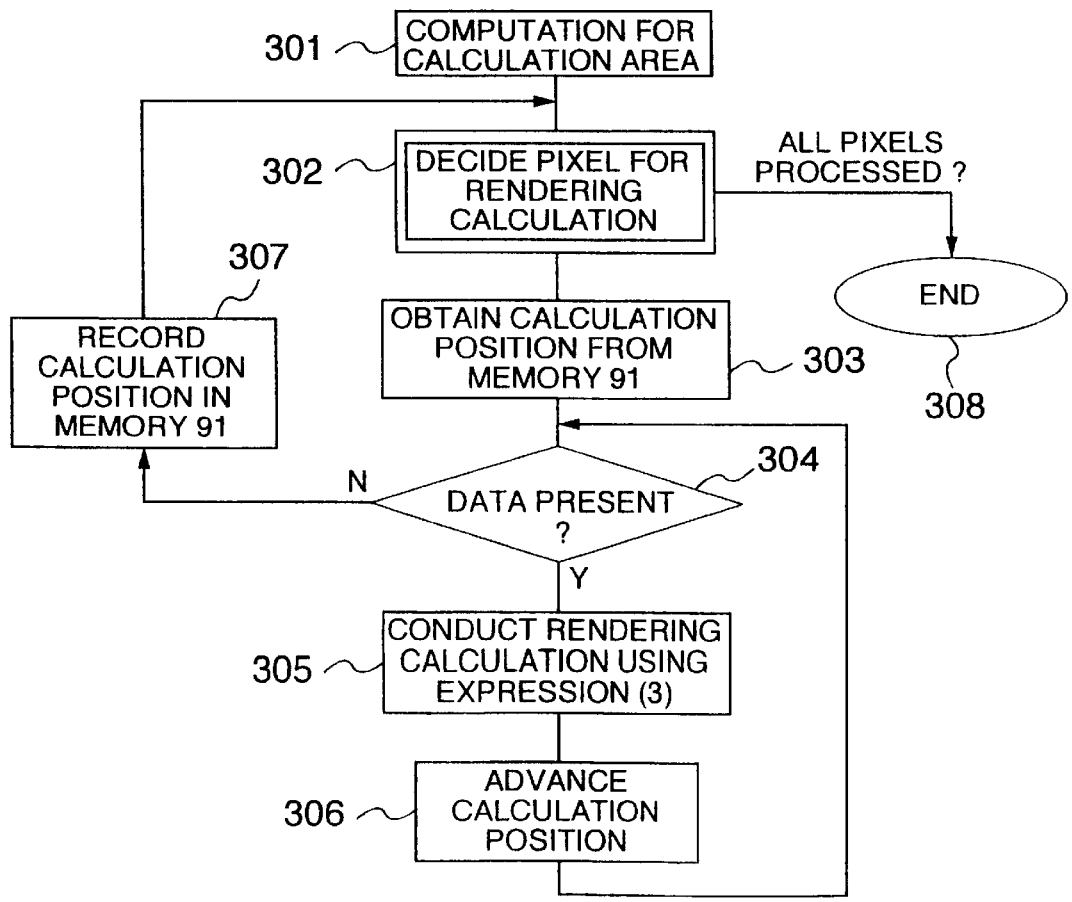
FIG. 15 is a flowchart showing calculations executed in a back-to-front method.

FIG. 15 is a flowchart showing the procedure to calculate projection values. Assume that the calculation has already been conducted for the volume data 43 associated with depth values "10" to "6", the value of light quantity C6 for depth value "6" is stored in the memory 92, and depth value "5" is memorized in the memory 91. First, according to the projection pixel value memory 90, there is decided the calculation area related to the range of the projection plane 23 onto which the overall image of the existing value data 43 and new volume data 71 is projected (step 301). Subsequently, the pixels in the area 93 are checked to determine the pixels for which the calculation of projection is to be conducted (step 302). The memory 91 in which the next calculating position associated with the pixel position is stored is accessed to attain therefrom depth value "5" for which the rendering calculation is carried out (step 303) and then a check is made to decide whether or not volume data exists at the position (step 304). If the volume data is present, the rendering calculation is conducted using expression (3) according to value C6 in the memory 92, thereby obtaining light quantity C5 (step 305). Control for calculation is advanced to the next position to set the depth value to "4" (step 306), and then control is passed to step 304. When data is missing at the position in step 304, the depth value "4" is stored in the memory 91 and the calculated value C5 is written in the memory 92 (step 307) and control is returned to step 302 to accomplish the similar calculation for the succeeding pixel. When it is detected that all pixels in the calculation area 93 have been completely processed, the calculation process is terminated (step 308).

Next, the calculation using the front-to-back method will be described by referring to FIGS. 13B, 16, and 17.

FIG. 13B shows the positional relationship between the projection plane and volume data when the front-to-back is employed for the calculation. To simplify explanation, the projection plane 23 is assumed to be parallel to the volume data 21. Furthermore, assume that the surface of the existing volume data 43 most apart from the projection plane 23 has a relative magnitude of depth of "1" in the diagram, the existing volume data 43 has a relative size of thickness of 5, and the new volume data 71 has a relative magnitude of thickness of 1. In a situation in which the projection plane 23 and volume data 21 are fixed according to the positional relationship shown in FIG. 13B, the existing value data 43 has already been projected and a 3D image has been generated and the new volume data 71 is received in the state above.

Figure 16:
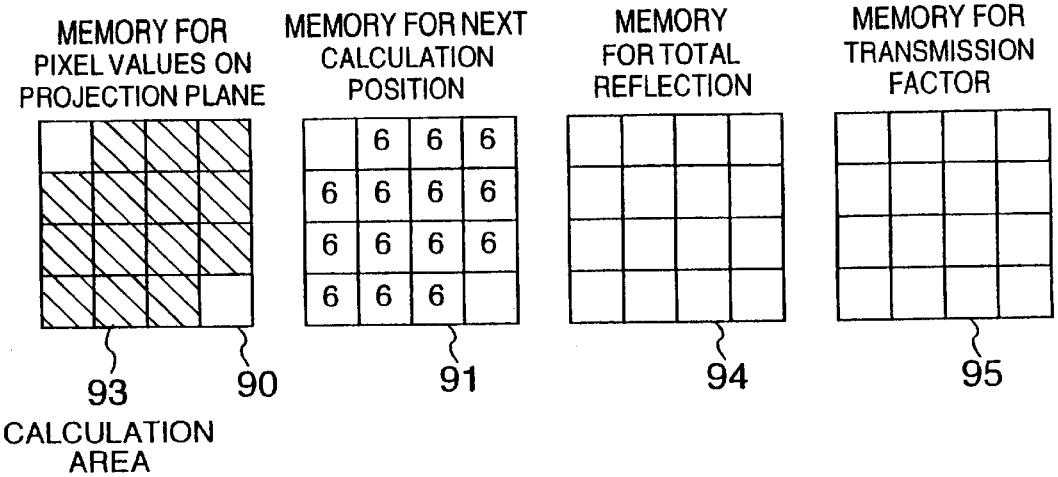
FIG. 16 is a diagram showing an example of memories necessary when a front-to-back method is employed.

FIG. 16 shows the memory areas necessary to attain projection values. A projection plane pixel value memory 90, a next calculating position memory 91, and a calculation area 93 are almost the same as those of FIG. 14. However, the initial value of the memory 91 is equal to the depth value of volume data next to the projection plane 23. A total reflection quantity memory 94 is utilized to store therein the total quantity of reflection light Pn−1 of expression (4). A transmission factor memory 95 is disposed to memorize therein the transmission factor A(n−1) of expression (4).

Figure 17:
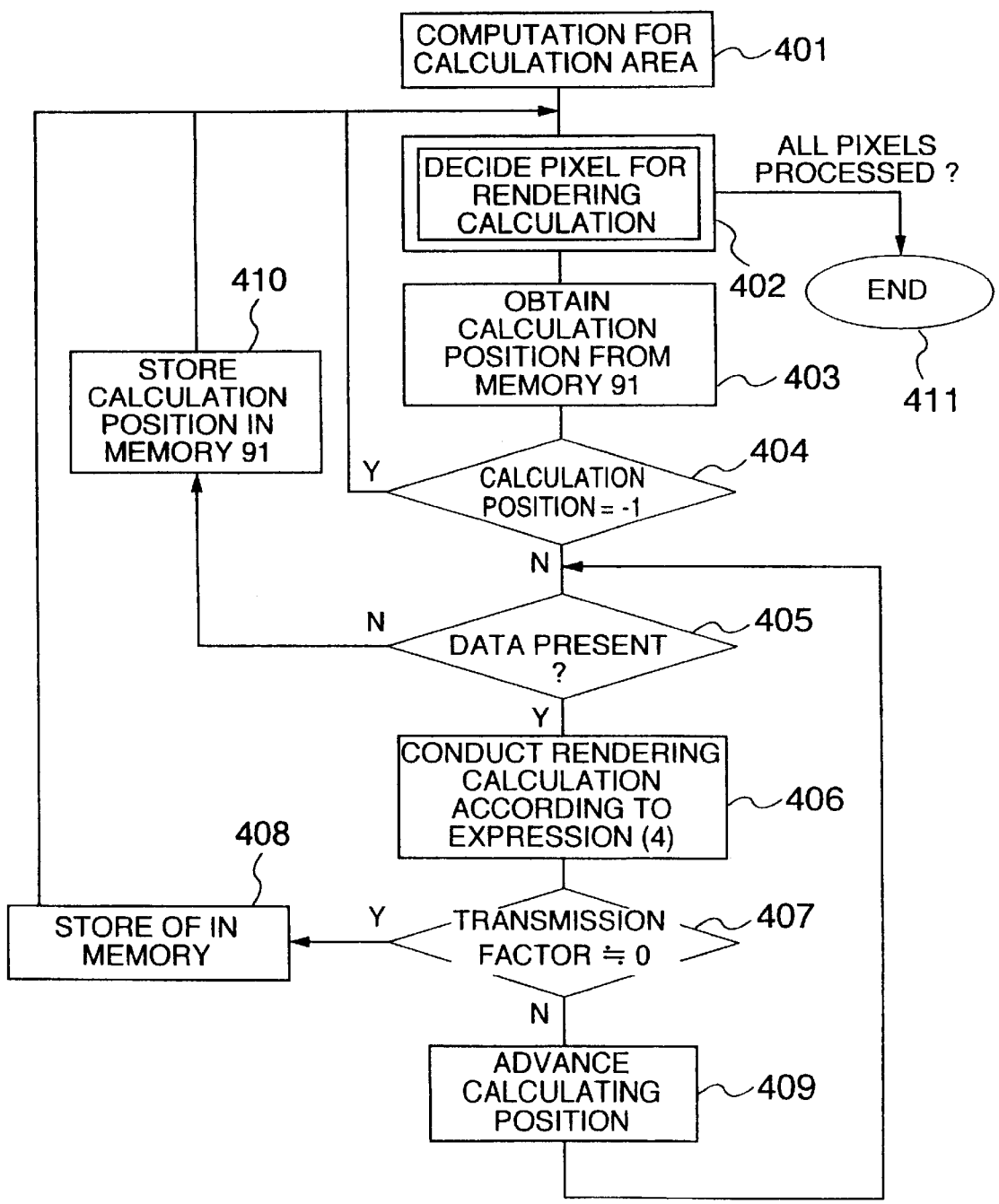
FIG. 17 is a flowchart showing computations executed in a front-to-back method.

FIG. 17 is a flowchart showing the procedure to calculate projection values. Assume that the calculation has already been conducted for the volume data 43 associated with depth values "1" to "5", the value of P5 is already stored in the memory 94, the value of A(5) is beforehand memorized in the memory 95, and depth value "6" is stored in memory 91 in advance. When the depth value is −1 in the memory 91, the calculation is terminated for the associated pixel position. First, as in FIG. 15, the calculation area is attained according to the projection pixel value memory 90 (step 401). Next, a check is made for the pixels in the area 93 to determine any pixel for which the calculation of projection is to be conducted (step 402). Obtained from the memory 91 in which the next calculating position corresponding to the pixel position is stored is depth value "6" for which the rendering calculation is accomplished (step 403). A check is carried out to decide whether or not the attained depth value is −1 (step 404). If the depth value is −1, control is transferred to step 402 to conduct the calculation for the next pixel. Otherwise, a check is made to determine whether or not volume data exists at the position (step 405). If the volume data is present, the rendering calculation is conducted using expression (4) according to value P4 in the memory 92 in which calculated values are stored and the value A(5) in the memory 95 so as to attain transmission factor A(6) (step 406). A check is then made to determine whether or not the light transmission factor is assumed to be 0 (step 407). As a result of the check, if the factor is assumed to be 0, namely, A(6)≈0, a value of −1 is stored in the memory 91 (step 408) and then control is passed to step 402. Otherwise, i.e., A(6)≠0, control for calculating is advanced to the next position (step 409) and then control is passed to step 405. When data is missing in step 405, the next calculating position 7 is stored in the memory 91 and the calculated value P6 and A(6) are respectively stored in the memories 94 and 95 (step 410). Control is thereafter returned to step 402. When it is detected that all pixels in the calculation area 93 have been completely processed, the calculation process is terminated (step 411).

Since the 3D generation process according to the embodiment above is required to be carried out only for a portion related to the new volume data using the beforehand calculated values, the processing speed can be increased. However, when an indication is supplied from the input device 6 to modify rendering parameters, the 3D image is generated again according to the overall volume data available at the point.

Finally, description will be given of an embodiment of the present invention in which a 3D image is produced using continuous volume data in a case in which, for example, the data measurement is achieve for a bag being transported by a belt conveyor.

Figure 18:
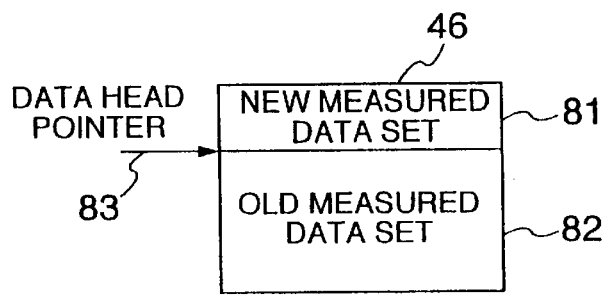
FIG. 18 is a diagram showing an embodiment related to a method of controlling a storage area for one data set of FIG. 10.

FIG. 18 shows a method of controlling the memory for one data set 46 in FIG. 10. A new measured data set 81 indicates an area in which new data is written, an old measured data set 82 stands for an area in which data is already written, and a data head pointer 83 designates an area including a pointer which indicates the first position of volume data. In this case, the measured data is continuous, whereas the volume data stored in the area 45 of FIG. 10 has an arbitrary data length. In this situation, for an efficient data control operation, when a predetermined period of time lapses or when a preset volume of data is stored, the data thus obtained may be treated as an independent data set. The new write data is written in an area of the oldest data in the data stored in the area 46. In the operation, to control the volume data as successive data, the position of the data head pointer 81 is moved each time the data is updated.

Figure 19:
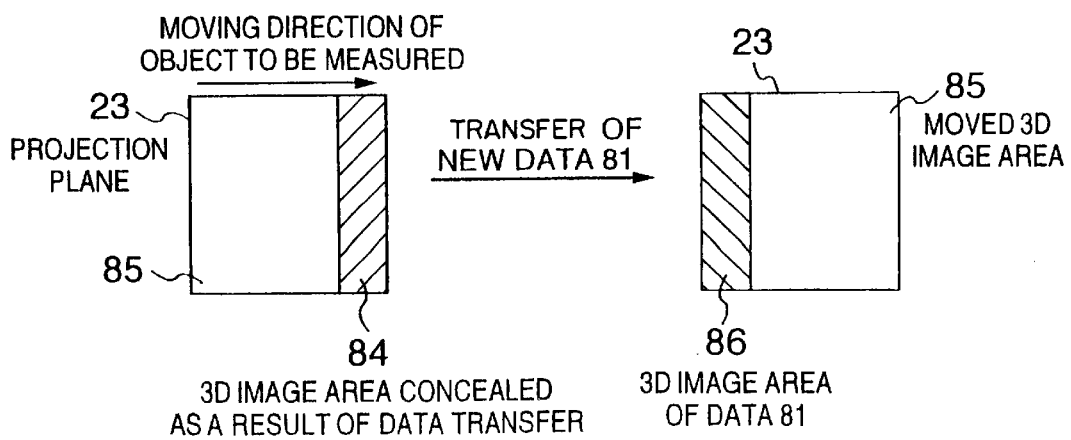
FIG. 19 is a diagram showing examples display images of continuously measured data.

FIG. 19 shows an operation example in which an object horizontally transported to the right in the projection screen is continuously measured so as to display an image of the object at a fixed position. An area 84 is concealed in the projection screen when new volume data is transferred, an area 85 is a 3D image area onto which the old measured data set 82 of FIG. 18 is projected, and an area 86 is a 3D image area onto which the new measured data set 81 of FIG. 18 is projected. When the new data is transferred, there is obtained the area 84 which is concealed in the projection plane due to the new data. The remaining 3D image area 85 is moved right according to the size of the area 84. Thereafter, the rendering calculation is effected for the new volume data of the new measured data set 81 to attain the 3D image in the area 86 and then the image is displayed.

According to the embodiment, data received in a successive fashion can be continuously displayed. Moreover, if the system is modified, for example, by modifying rendering parameters to display an internal image of the bag, it is possible to continuously examine the internal state of the bag.

As above, according to the present invention, the 3D image generating speed can be increased almost in proportion to the increase in number of processors, and the 3D image can be produced in an online system depending on the number of processors.

Additionally, the throughput ranging from the measurement of volume data to the first display of the 3D image can be improved, and hence the rendering parameters can be modified and/or the data work operation can be accomplished in concurrence with the data measurement. Furthermore, since the 3D image can be confirmed during the data measurement, it is possible to conduct again the measurement beginning at the first step thereof, and the efficiency of the overall operation can also be improved.

In addition, for data which is continuously measured and transferred to the system, the latest volume data can be displayed according to desired rendering parameters in any situation.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A high-speed 3D image generating apparatus for generating and displaying a three-dimensional (3D) image of a display object arranged as an object of image generation in a 3D space and projected onto a projection plane according to volume data representing a distribution of a visual attribute at each position of the 3D space and rendering parameters determining characteristics of the image to be displayed, comprising:

volume data acquiring means for acquiring the volume data;

volume data storage means for storing therein the acquired volume data;

input means for inputting the rendering parameters;

3D image generation process means, including a plurality of processors, for estimating a quantity of calculations necessary for the creation process of the 3D image according to a portion of the volume data stored in said volume data storage means, subdividing the generation process into sub-processes and thereby substantially equalizing the quantities of calculations respectively allocated to the plural processors, concurrently executing the sub-processes by the plural processors according to the volume data stored in said volume data storage means and the rendering parameters input thereto, and generating a 3D image; and image output means for visualizing the generated 3D image, wherein the 3D image generation process means sequentially performs the steps of:

resampling the voxel value of the volume data representing the 3D space in a normal direction beginning at a first pixel group arranged in the projection plane with an interval larger than a pixel interval of pixels for which the 3D image generation process is to be executed on the projection plane, the resampling interval being larger than the pixel interval, deciding a first position group including a position at which the voxel value attained as a result of the resampling step exceeds a preset threshold value and a position which is on the normal line and which are least apart from the projection plane on the normal line, deciding a second position group including a position on a normal line passing each pixel of a second pixel group including pixels other than those of the first pixel group and a position interpolated according to positions of the first position group associated with one or more pixels of the first pixel group in the periphery of the pertinent pixel, and subdividing voxel data of voxels at respective positions of the first and second position groups into as many subdata items as there are processors.

2. A high-speed 3D image generating apparatus according to claim 1, wherein:

said 3D image generation process means concurrently executes, by the plural processors, the processes respectively of deciding the first and second position groups.

3. A high-speed 3D image generating apparatus for generating and displaying a three-dimensional (3D) image of a display object arranged as an object of image generation in a 3D space and projected onto a projection plane according to volume data representing a distribution of a visual attribute at each position of the 3D space and rendering parameters determining characteristics of the image to be displayed, comprising:

volume data acquiring means for acquiring the volume data;

volume data storage means for storing therein the acquired volume data;

input means for inputting the rendering parameters;

3D image generation process means, including a plurality of processors, for estimating a quantity of calculations necessary for the creation process of the 3D image according to a portion of the volume data stored in said volume data storage means, subdividing the generation process into subprocesses and thereby substantially equalizing the quantities of calculations respectively allocated to the plural processors, concurrently executing the sub-processes by the plural processors according to the volume data stored in said volume data storage means and the rendering parameters input thereto, and generating a 3D image; and image output means for visualizing the generated 3D image, wherein the 3D image generation process related to the existing volume data by said 3D image generation process means and the new volume data acquisition by said volume data acquiring means are concurrently executed when the existing volume data acquired beforehand is updated using new volume data, thereby sequentially achieving the visualization of the 3D image on said image output means in relation to the existing volume data and the new volume data.

4. A high-speed 3D image generating apparatus according to claim 3, wherein:

the apparatus generates, when the new volume data of one measured cross section is acquired in a state in which the projection plane is positioned to be perpendicular to a planar direction of a cross section of the display object corresponding to volume data of one measured cross section input to the volume data storage means, a 3D image corresponding to the new volume data of one measured cross section according to the rendering parameters supplied from said input means.

5. A high-speed 3D image generating apparatus according to claim 3, wherein:

said 3D image generation process means generates, when a positional relationship between the projection plane and the display object is fixed in the 3D space and the new volume data is additionally stored in said volume data storage means, a latest 3D image according to the existing volume data and the new volume data.

6. A high-speed 3D image generating apparatus for generating and displaying a 3D image of a display object arranged as an object of image generation in a 3D space and projected onto a projection plane according to volume data representing a distribution of a visual attribute at each position of the 3D space, comprising:

volume data acquiring means for acquiring the volume data;

volume data storage means for storing therein the acquired volume data;

3D image generation process means including a plurality of processors for generating the 3D image according to the volume data stored in the storage means; and image output means for visualizing the generated 3D image.

the 3D image generation process means, in response to an event that the existing volume data already acquired, is updated according to new volume data for selectively using methods of calculations related to the 3D image generation according to a data accumulating direction in which the new volume data is accumulated, wherein:

the 3D image generation process means uses, when the data accumulating direction exceeds 90 degrees relative to a viewing direction, a calculation method in which a quantity of reflection light of voxels less apart from the projection plane is obtained according to voxel values of voxels apart from the projection plane on an axis of the viewing direction and quantities of reflection light of the voxels; and the 3D image generation process means uses, when the data accumulating direction is equal to or less than 90 degrees relative to the viewing direction, a calculation method in which a quantity of light passing through voxels apart from the projection plane according to voxel values of voxels less apart from the projection plane on the axis of the viewing direction and qualities of light passing through the voxels.

* * * * *